US007543323B1

(12) United States Patent
Zigmond et al.

(10) Patent No.: US 7,543,323 B1
(45) Date of Patent: Jun. 2, 2009

(54) RETRIEVING CONTENT USING BATCH MODE AND REAL-TIME LOGICAL ADDRESSES

(75) Inventors: Daniel J. Zigmond, San Francisco, CA (US); Dean Blackketter, San Francisco, CA (US); William M. Gillon, Daly City, CA (US); Phillip Goldman, Los Altos, CA (US)

(73) Assignee: Microsoft Corporation, Redmond, WA (US)

( * ) Notice: Subject to any disclaimer, the term of this patent is extended or adjusted under 35 U.S.C. 154(b) by 1600 days.

(21) Appl. No.: 10/133,554

(22) Filed: Apr. 26, 2002

Related U.S. Application Data

(63) Continuation of application No. 09/099,118, filed on Jun. 17, 1998, now Pat. No. 6,400,407.

(51) Int. Cl.
*G06F 3/00* (2006.01)
*G06F 13/00* (2006.01)
*H04N 5/445* (2006.01)
*H04N 7/173* (2006.01)
*H04N 11/00* (2006.01)
*H04N 5/44* (2006.01)

(52) U.S. Cl. .................... 725/51; 725/109; 725/110; 348/468; 348/553

(58) Field of Classification Search .............. 725/51, 725/136, 109, 110; 348/468, 478, 553, 569, 348/564
See application file for complete search history.

(56) References Cited

U.S. PATENT DOCUMENTS

| | | | |
|---|---|---|---|
| 4,894,789 A | 1/1990 | Yee | 364/521 |
| 5,010,499 A | 4/1991 | Yee | 364/521 |
| 5,121,476 A | 6/1992 | Yee | 395/154 |
| 5,648,824 A | 7/1997 | Dunn et al. | |

(Continued)

FOREIGN PATENT DOCUMENTS

WO     WO 97/22207     6/1997

(Continued)

OTHER PUBLICATIONS

J. Gifford, "Teletext Decoder," Radio-Electronics, Apr. 1996, pp. 45-49.

(Continued)

*Primary Examiner*—Joseph G Ustaris
(74) *Attorney, Agent, or Firm*—Klarquist Sparkman, LLP

(57) ABSTRACT

Displaying content associated with a television program using logical addresses identifying the content. Content associated with the television program is automatically displayed by a set top box. Before the broadcast of a program, television listing information, such as EPG data, is stored at the set top box. The listing information includes batch mode logical addresses or links. During the program, a viewer is notified about the link, enabling the content to be accessed and displayed concurrently with the program. In addition, real-time logical addresses or links, which are embedded in the program, may be extracted and displayed to the viewer. If both the real-time and batch mode links are available, a determination is made according to pre-defined rules regarding which link is brought to the attention of the viewer. In this manner, real-time links can be supplied with the broadcast to supplement or replace the batch mode links.

24 Claims, 7 Drawing Sheets

U.S. PATENT DOCUMENTS

| | | | |
|---|---|---|---|
| 5,737,552 A | 4/1998 | Lavallee et al. | |
| 5,761,606 A | 6/1998 | Wolzien | |
| 5,771,354 A | 6/1998 | Crawford | |
| 5,774,666 A | 6/1998 | Portuesi | |
| 5,778,181 A | 7/1998 | Hidary et al. | 395/200.48 |
| 5,801,747 A | 9/1998 | Bedard | |
| 5,818,441 A | 10/1998 | Throckmorton et al. | |
| 5,818,935 A | 10/1998 | Maa | |
| 5,832,223 A | 11/1998 | Hara et al. | |
| 5,844,620 A | 12/1998 | Coleman et al. | |
| 5,848,352 A | 12/1998 | Dougherty et al. | |
| 5,864,823 A | 1/1999 | Levitan | |
| 5,867,208 A | 2/1999 | McLaren | |
| 5,929,849 A | 7/1999 | Kikinis | |
| 5,929,850 A | 7/1999 | Broadwin et al. | |
| 5,931,908 A | 8/1999 | Gerba et al. | |
| 5,940,073 A | 8/1999 | Klosterman et al. | |
| 5,961,603 A | 10/1999 | Kunkel et al. | |
| 6,002,394 A | 12/1999 | Schein et al. | |
| 6,002,444 A | 12/1999 | Marshall et al. | |
| 6,009,410 A | 12/1999 | LeMole et al. | |
| 6,011,537 A | 1/2000 | Slotznick | |
| 6,018,768 A | 1/2000 | Ullman et al. | |
| 6,023,698 A | 2/2000 | Lavey et al. | |
| 6,026,435 A | 2/2000 | Enomoto et al. | |
| 6,058,430 A | 5/2000 | Kaplan | 709/245 |
| 6,061,719 A * | 5/2000 | Bendinelli et al. | 709/218 |
| 6,064,376 A | 5/2000 | Berezowski et al. | |
| 6,075,568 A | 6/2000 | Matsuura | |
| 6,081,842 A | 6/2000 | Shacher | 709/229 |
| 6,108,706 A * | 8/2000 | Birdwell et al. | 709/229 |
| 6,141,678 A | 10/2000 | Britt, Jr. | |
| 6,169,541 B1 | 1/2001 | Smith | |
| 6,215,483 B1 | 4/2001 | Zigmond | |
| 6,229,532 B1 | 5/2001 | Fuji | 345/327 |
| 6,240,555 B1 | 5/2001 | Shoff et al. | |
| 6,243,741 B1 | 6/2001 | Utsumi | 709/208 |
| 6,260,192 B1 | 7/2001 | Rosin et al. | |
| 6,285,407 B1 | 9/2001 | Yasuki et al. | |
| 6,317,780 B1 | 11/2001 | Cohn et al. | |
| 6,335,736 B1 | 1/2002 | Wagner et al. | |
| 6,367,080 B1 | 4/2002 | Enomoto et al. | |
| 6,373,503 B1 | 4/2002 | Perkes | |
| 6,400,407 B1 | 6/2002 | Zigmond et al. | |
| 6,412,111 B1 | 6/2002 | Cato | |
| 6,473,903 B2 | 10/2002 | Balakrishnan et al. | |
| 6,510,557 B1 | 1/2003 | Thrift | |
| 6,512,551 B1 | 1/2003 | Lund | |
| 6,564,379 B1 | 5/2003 | Knudson et al. | |
| 6,584,153 B1 | 6/2003 | Gordon et al. | |
| 6,604,242 B1 | 8/2003 | Weinstein et al. | |
| 6,615,251 B1 | 9/2003 | Klug et al. | |
| 6,662,007 B2 | 12/2003 | Yuen | |
| 6,754,905 B2 | 6/2004 | Gordon et al. | |
| 6,886,178 B1 * | 4/2005 | Mao et al. | 725/52 |
| 2001/0001160 A1 | 5/2001 | Shoff et al. | |
| 2001/0056577 A1 | 12/2001 | Gordon et al. | |
| 2002/0010926 A1 | 1/2002 | Lee | |
| 2003/0005463 A1 | 1/2003 | Macrae et al. | |
| 2004/0103439 A1 | 5/2004 | Macrae et al. | |

FOREIGN PATENT DOCUMENTS

WO      WO 98/17064      4/1998

OTHER PUBLICATIONS

Electronic Industries Association Engineering Department, "EIA Standard Recommended Practice For Line 21 Data Service," Sep. 1994, pp. 1-120.

Jones, "The Microsoft Interactive TV System: An Experience Report", pp. 1-15 (Jul. 1997).

* cited by examiner

RETRIEVING CONTENT USING BATCH MODE AND REAL-TIME LOGICAL ADDRESSES

CROSS REFERENCE TO RELATED APPLICATIONS

This application is a continuation of U.S. patent application Ser. No. 09/099,118, filed on Jun. 17, 1998 now U.S. Pat. No. 6,400,407, entitled "Communicating Logical Addresses of Resources in a Data Service Channel of a Video Signal," which is incorporated herein by reference.

FIELD OF THE INVENTION

The invention relates generally to the integration of broadcast television programming with content from the Internet, World-Wide Web, Intranet, and/or other remote or local resources. More specifically, the invention relates to transporting logical addresses for such content as part of a broadcast television signal.

BACKGROUND OF THE INVENTION

The World-Wide Web (the Web) is a collection of formatted hypertext pages located on numerous computers around the world that are logically connected by the Internet. The Web has become a valuable resource for information relating to almost any subject, including entertainment, business, travel, and education, to name just a few. Web browsers, software providing user interfaces to the Web, allow individuals to access Internet content from personal computers. Internet terminals, such as those pioneered by WebTV Networks, Inc., of Mountain View, Calif., have made the Web accessible to an even larger segment of the population by providing access to the Web without the use of a personal computer. Internet terminals (also commonly referred to as set-top boxes) provide individuals with access to Web pages using an ordinary television (TV) set as a display and a remote control or wireless keyboard for user input.

Many Web sites include content relating to popular television programs, specific episodes, and their characters, for example. It would be desirable to provide a mechanism for integrating broadcast television programming with the Web to facilitate the retrieval and viewing of this and other content concurrently with the television broadcast or at a later time at the option of the viewer. In particular, it would be desirable to provide a practical mechanism for communication of logical addresses, such as Uniform Resource Locators (URLs), for Internet content relating to a television broadcast, for example, as part of the television signal.

The Electronic Industries Alliance (EIA) has published a standard relating to embedding data in line 21 of the vertical blanking interval (VBI) of a National Television Standards Committee (NTSC) video signal entitled, "Recommended Practice for Line 21 Data Service," approved Sep. 20, 1994 (hereinafter "EIA-608"). EIA-608 describes various data services, such as closed captioning, text services, and extended data services (XDS) that are carried in line 21 of the VBT of an NTSC video signal. Details regarding these services can be found in EIA-608 which is incorporated herein by reference.

One approach that has been suggested for transmitting URLs as part of an NTSC video signal is to embed URLs in the Extended Data Service (XDS) channel. However, this approach has several limitations. For example, XDS packets are limited to 32 bytes including packet overhead. Since URLs and data associated therewith will typically exceed 32 bytes, this data would have to be spread over multiple XDS packets. Additionally, if URLs were to be transmitted in XDS packets they would compete for the limited bandwidth available to XDS with V-Chip program rating information. Bandwidth available to XDS may at times be insufficient to fully support both URLs and V-Chip rating information. Another problem with this approach is the difficulty associated with having more than one "active" URL for a program at the same time. This problem stems from (1) the difference between URLs and attributes that are typically associated with a program by way of XDS, such as a scheduled start time, a duration, an elapsed time, a program title, etc. and (2) the repetitive nature of XDS packets. Typically, only the most recently received attribute of a program is active. For example, an earlier elapsed time value associated with a particular program is replaced by a subsequently received elapsed time value associated with that program. In contrast, such behavior is undesirable for URLs as it may often be beneficial to have multiple URLs active at a given time during a program.

With regard to the repetitive nature of XDS packets, EIA-608 recommends transmitting XDS packets continuously to fill all available bandwidth beyond what is used by the captioning and text services and suggests repetition rate algorithms based on packet priorities. Briefly, as XDS usage increases, the repetition rate for each of the types of packets is decreased and XDS packets of the same type (e.g., those having the same packet ID) may be deleted by downstream encoders to accommodate the additional XDS traffic. Therefore, the only way to guarantee reception by the viewer of multiple URLs per television program is to provide unique packet IDs for each URL to assure they are not deleted as more of the XDS bandwidth is consumed downstream. However, coordinating such unique packet IDs among the many potential originators of URLs is not practical.

In light of the foregoing, what is needed is a more intelligent mechanism for communicating logical addresses associated with local and/or remote content within a video signal. In particular, it is desirable to accommodate the need for multiple active URLs at a given time during a TV program. Additionally, it is desirable to provide for improved error detection. Further, it is advantageous to choose a portion of the video signal which does not compete directly for bandwidth with V-Chip rating information, Finally, it is desirable to utilize a syntax that is suitable for a broad set of devices.

SUMMARY OF THE INVENTION

A method and apparatus are described for communicating logical addresses within a broadcast television signal. According to one aspect of the present invention, a logical address of a resource may be communicated to a receiving device by way of a data service channel of a video signal. A sequence of data complying with a predetermined syntax and including the logical address is embedded in either a text service channel or a captioning service channel of the video signal. Advantageously, in this manner, when the video signal is transmitted, it is accompanied by the logical address.

According to another aspect of the present invention, a logical address of a resource may be received by way of a data service channel of a video signal. A video signal including data associated with one or more data services is received. Subsequently, a sequence of data complying with a predetermined syntax is retrieved from either a captioning service or a text service. Ultimately, a logical address may be extracted from the video signal by parsing the sequence of data.

Other features of the present invention will be apparent from the accompanying drawings and from the detailed description which follows.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
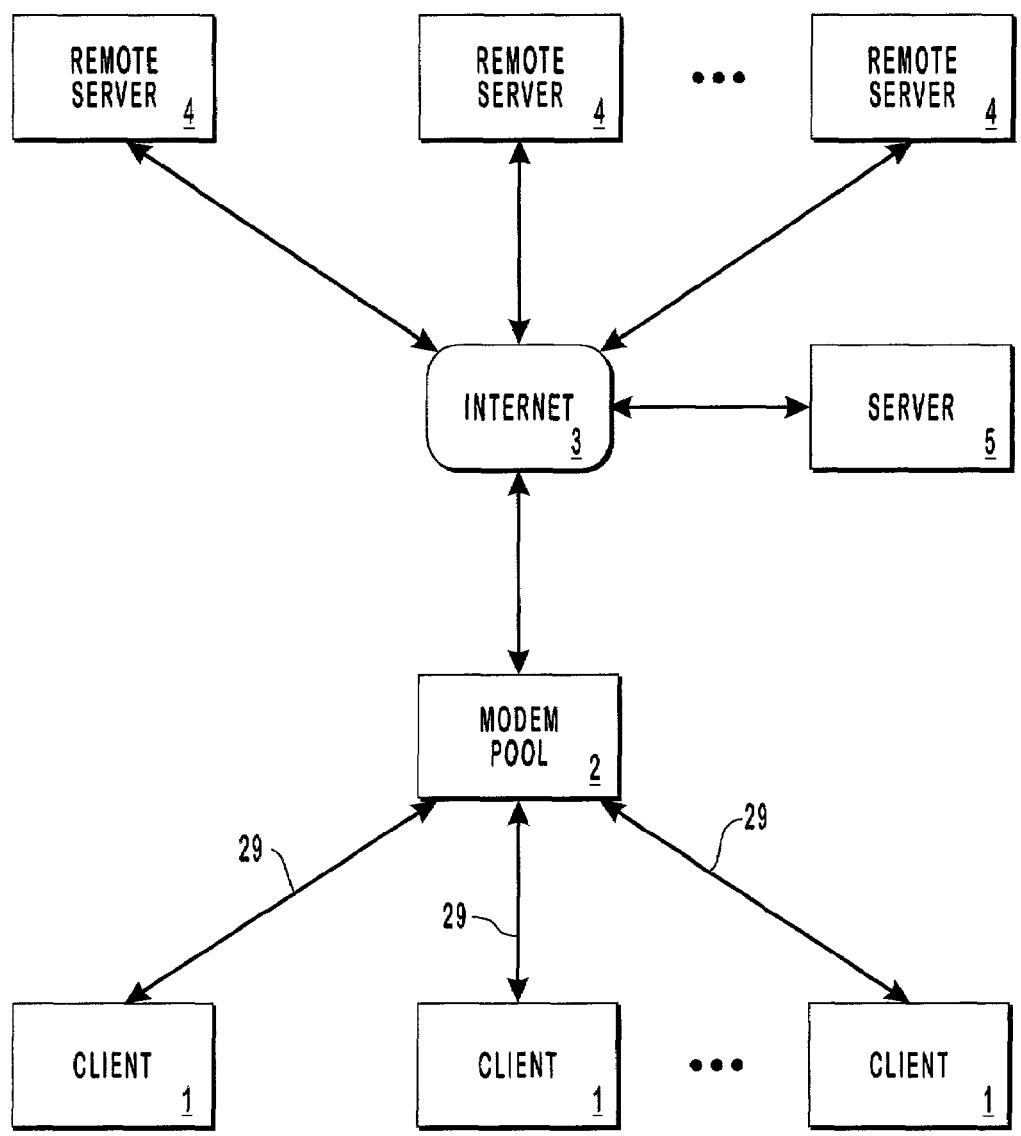
FIG. 1 is a block diagram illustrating several clients connected to a server system.

A method and apparatus are described for transporting logical addresses within a broadcast television signal. The logical addresses may provide "links" to Internet, Web, or other local or remote content related or unrelated to a program being broadcast. A form of logical address (also referred to as a resource locator) commonly associated with Web content is a Uniform Resource Locator (URL). A URL is a compact string representation of a location used to identify an abstract or physical resource on the Internet Of course, alternative means of uniquely identifying content may be employed. For example, it is appreciated that keys (e.g., database indices), network addresses (e.g., IP addresses), and other identification mechanisms, alone or in combination, may be employed to uniquely identify a resource. Therefore, while the term URL refers to a specific type of content identifier used in connection with the Web, the terms logical address and/or resource locator are used herein to refer to content/resource identification mechanisms generally.

At any rate, supplying links to Internet/Web content provides an easy and powerful way to bring the richness and interactive nature of the Internet to TV. Such links may be used by program producers, program sponsors, networks, local affiliates and other content providers to link TV viewers to web content specifically designed to complement what the viewers are watching on TV at a given time. According to one aspect of the present invention, a means is provided for transmitting logical addresses that identify content (e.g., Internet content) within a video signal. For example, content providers may transmit URLs to viewers by employing a predetermined syntax to insert the URLs within line 21 of the vertical blanking interval of an analog television signal. According to another aspect of the present invention, upon receipt of a logical address in a TV signal, an icon or some other visual indication may be presented to the viewer to notify the viewer of the availability of Internet content. The viewer may then select the visual indication to view the content concurrently with the TV broadcast or save the logical address for later viewing.

The present invention includes various steps, which will be described below. The steps can be embodied in machine-executable instructions, which can be used to cause a general-purpose or special-purpose processor programmed with the instructions to perform the steps. Alternatively, the steps of the present invention might be performed by specific hardware components that contain hardwired logic for performing the steps, or by any combination of programmed computer components and custom hardware components.

Importantly, while embodiments of the present invention will be described with respect to viewing Web content on an Internet terminal system, such as the WebTV® Internet terminal, the method and apparatus described herein are equally applicable to other types of content that may be stored remotely or content that may be directly accessible to the viewing system. For example, logical addresses embedded in a video signal may refer to content stored on a CD-ROM or other mass storage device, a company's Intranet server, or other resource. Additionally, certain aspects of the invention described herein have equal application to various other TV viewing devices, such as personal computers equipped with TV tuners, and the like. Moreover, while various embodiments of the present invention will be described with reference to an NTSC broadcast video signal, aspects of the present invention are equally applicable to other broadcast TV systems, such as Phase Alternating Lines (PAL), Sequential Couleur Avec Memoire (SECAM), and the proposed High Definition Television (HDTV) standard. Finally, it is appreciated that a variety of other transport mechanisms may be employed, including digital satellite, digital TV, and cable TV.

System Overview

Aspects of the present invention may be included in an Internet system terminal, such as the WebTV internet terminal, for providing a user with access to the Internet. As will be discussed further below, the Internet system includes an Internet terminal (also referred to as an Internet System client) ("client") and an Internet server ("server"). A user of an Internet terminal generally accesses a server via a direct-dial telephone (POTS, for "plain old telephone service"), ISDN (Integrated Services Digital Network), or other similar connection, in order to browse the Web, send and receive e-mail, and use various other Internet system network services. Services provided by the Internet system network service, such as the WebTV network, are typically provided by servers using software residing within the servers in conjunction with software residing within a client.

FIG. 1 illustrates a basic configuration of an Internet system network in which one embodiment of the present invention may be implemented. A number of clients 1 are coupled to a modem pool 2 via direct-dial, bi-directional data connections 29, which may be telephone (POTS, i.e., "plain old telephone service"), ISDN (Integrated Services Digital Network), or any other similar type of connection. Other connection mechanisms may be employed such as cable and satellite forward channels, for example. In any event, the modem pool 2 is coupled typically through a router, such as that conventionally known in the art, to a number of remote servers 4 via a conventional network infrastructure 3, such as the Internet. The Internet system also includes a server 5, which specifically supports the clients 1. The clients 1 each have a connection to the server 5 through the modem pool 2 and the Internet 3. Note that the modem pool 2 is a conventional modem pool, such as those found today throughout the world providing access to the Internet and private networks.

An Exemplary Client System

Figure 2:
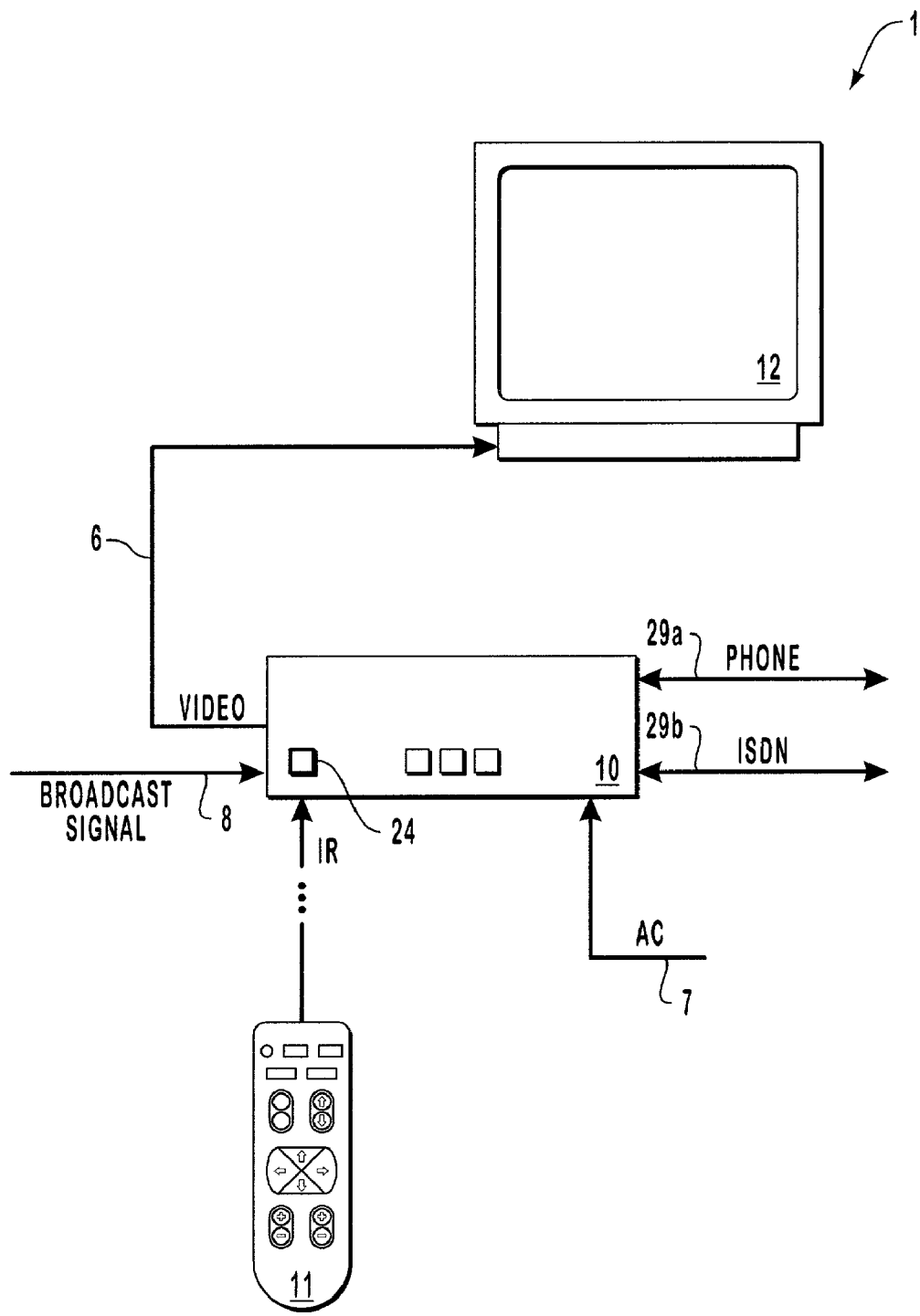
FIG. 2 is a diagram illustrating a client according to one embodiment of the present invention.

FIG. 2 illustrates an Internet system client ("client") 1 known in the art. The client 1 includes an electronics unit 10 (hereinafter referred to as "the set-top box 10"), an ordinary television Set 12, and a remote control 11 In an alternative embodiment of the present invention, the set-top box 10 is built into the television set 12 as an integral unit. In the embodiment depicted, the client 1 uses the television set 12 as a display device for displaying video data and a graphical user interface. The set-top box 10 is coupled to the television set 12 by a video link 6. The video link 6 is an RF (radio frequency), S-video, composite video, or other equivalent form of video link.

The set-top box 10 includes hardware and/or software for receiving and decoding a broadcast video signal 8, such as an NTSC, PAL, SECAM or other TV system video signal) and providing video data to the television set via video link 6. The set-top box 10 also includes hardware and/or software for providing the user with a graphical user interface, by which the user can access various Internet system network services, browse the Web, send e-mail, and otherwise access the Internet. The user interface includes means for notifying the user of the presence of encoded data, such as URLs, embedded in the video signal. The notification may be audible, visual or a combination of the two. In one embodiment, the notification comprises temporarily displaying an icon in a portion of the screen.

The client 1 may include both a standard modem and an ISDN modem, such that the communication link 29 between the set-top box 10 and the server 5 can be either a telephone (POTS) connection 29a or an ISDN connection 29b. The set-top box 10 receives power through a power line 7.

Remote control 11 is operated by the user in order to control the client 1 in browsing the Web, sending e-mail, and performing other Internet-related functions. The set-top box 10 receives commands from remote control 11 via an infrared (IR) Communication link. In alternative embodiments, the link between the remote control 11 and the set-top box 10 may be RF or any equivalent mode of transmission.

Exemplary Client System Architecture

Figure 3:
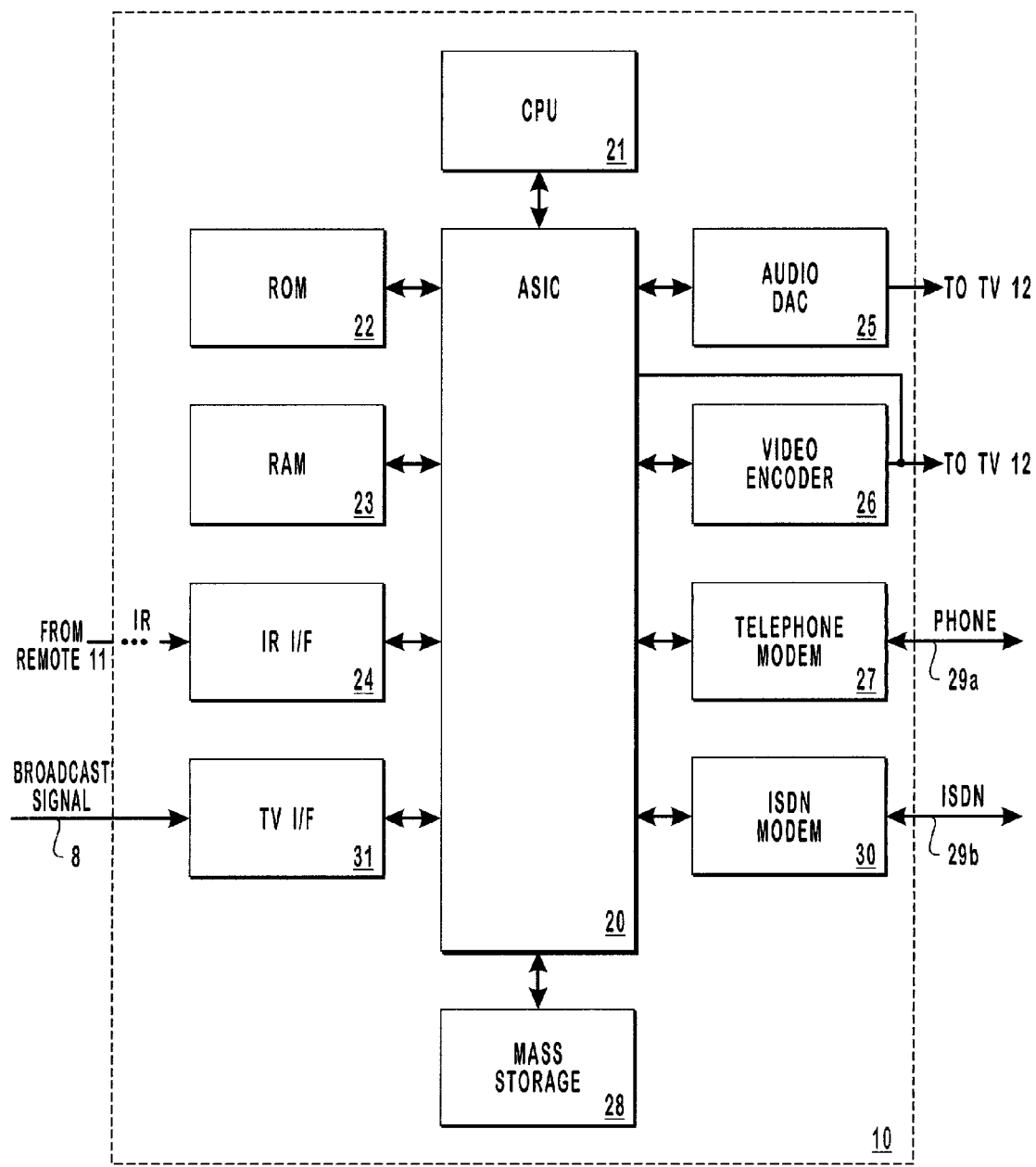
FIG. 3 is a block diagram illustrating exemplary functional units of a set-top box according to one embodiment of the present invention.

FIG. 3 is a block diagram illustrating internal features of the set-top box 10. In this example, operation of the client 1 is controlled by a processing unit, such as central processing unit (CPU) 21, which is coupled to an Application-Specific Integrated Circuit (ASIC) 20. The CPU 21 executes software designed to implement various features of the present invention. ASIC 20 Contains circuitry which may be used to implement certain features provided by the client 1. ASIC 20 is coupled to an audio digital-to-analog converter (DAC) 25 which provides audio output to television 12. In addition, ASIC 20 is coupled to a video encoder 26 which provides video output to television set 12. An IR interface 24 detects IR signals transmitted by remote control 11 and, in response, provides corresponding electrical signals to ASIC 20. A standard telephone modem 27 and/or an ISDN modem 30 are coupled to ASIC 20 to provide connections 29a and 29b, respectively, to the modem pool 2 and, via the Internet 3, to the remote servers 4. Note that the set-top box 10 also may include a cable television modem (not shown).

ATV interface 31 is coupled to ASIC 20 to receive broadcast video signals, such as an NTSC video signal, and provide corresponding electrical signals to ASIC 20, thereby allowing video data carried in the broadcast video signal 8 to be presented to the viewer on the TV 12. The TV interface 31 also extracts other data that may be embedded in the video signal. The data so extracted, or a portion thereof, may be displayed concurrently with a television program. For example, in one embodiment of the present invention, titles corresponding to logical addresses that have been inserted into a text mode data service or a captioning data channel of line 21 of the VBI are extracted by the TV interface 31 and displayed on the TV 12. An exemplary syntax for transporting logical addresses in line 21 of the VBI is described below.

Also coupled to ASIC 20 is Read-Only Memory (ROM) 22, which provides storage of program code for implementing application software to be executed by the set-top box 10. Note that ROM 22 may be a programmable ROM (PROM) or any form of erasable PROM (EPROM) or Flash memory. Also coupled to ASIC 20 is Random Access Memory (RAM) 23. A mass storage device 28 may optionally be provided and coupled to ASIC 20. The mass storage device 28 may be used to input software or data to the client or to download software or data received over network connection 29 or data embedded in broadcast signal 8. The mass storage device 28 includes any suitable medium for storing machine-executable instructions, such as magnetic disks, optical disks, and the like.

Logical Address Links

Having described an exemplary environment in which embedded logical addresses may be employed, logical address links, their syntax, and usage will now be discussed. Generally, logical address links, such as TV Crossover™ Links, enable seamless integration of television programming and the Internet by allowing Internet content to be associated with a television broadcast. In one embodiment of the present invention, the client 1 allows Web content and television programming to be concurrently displayed as described in U.S. patent application Ser. No. 09/087,354, entitled "Method and Apparatus for Displaying HTML and Video Simultaneously," filed May 29, 1998, which is incorporated herein by reference.

Importantly, associations between a television broadcast and Internet content may be performed in real-time or in batch mode. Real-time logical address links are sent to the TV viewer's client system during a television broadcast in line 21 of the VBI. In contrast, batch mode logical address links are delivered to the client system in advance of the television broadcast to which they relate. For example, batch mode logical address links may be downloaded from a Web server to the user's client system or delivered on CD ROM or other computer readable medium. According to one embodiment, batch mode logical address links are delivered as part of an electronic programming guide (EPG) and may be modified and/or supplemented with real-time logical address links. While real-time logical address links are valid for a predetermined amount of time after receipt by the client system, batch mode logical address links typically define a time interval.

For example, a batch mode logical address link may include a start time and an end time indicating when the link is to be made available to the viewer.

Syntax for Logical Address Links

Logical addresses may be transmitted in one of the text service channels of line 21, i.e., First Text Service (T1), Second Text Service (T2), Third Text Service (T3), or Fourth Text Service (T4), or one of the captioning data channels of line 21, i.e., Primary Synchronous Caption Service (CC1), Special Non-synchronous Use Captions (CC2), Secondary Synchronous Caption Service (CC3), or Special Non-synchronous Use Captions (CC4), by using the following encoding format for logical address strings on line 21 of the VBI:

<logical address>[attribute$_1$:value$_1$] [attribute$_2$:value$_2$] ... [attribute$_n$:value$_n$] [checksum]

The logical address (e.g., a URL) is enclosed in angle brackets. One or more pairs of attributes and values may follow the logical address in square brackets. Finally, a checksum follows the nth attribute/value pair in square brackets. It is appreciated that delimiter characters other than angle brackets and square brackets may be employed. However, it is important to avoid employing delimiters that are included in the URL character set. Additionally, it is preferable that the delimiter be present in both the standard EIA-608 character set and the US-ASCII character set to make logical address links relevant to the widest set of devices.

Attributes

Exemplary attributes include "type" and "name." The type attribute indicates to what the content associated with the URL relates. For example, the content may be related to the current television program, to the broadcast network, or to one of the commercial sponsors of the current TV program. Table 1 lists exemplary values that may be associated with the type attribute.

TABLE 1

Meaning of Type Attribute Values

| Type Attribute Value | Related to |
| --- | --- |
| PROGRAM | the current program |
| NETWORK | the broadcast network |
| STATION | the local station |
| SPONSOR | a commercial sponsor of the current program |
| OPERATOR | the service (e.g., cable or satellite) operator |

The name attribute provides a concise title for the resource identified by the logical address. It is preferable to associate a title with a logical address since the logical address itself doesn't always make clear what the content of the identified resource is. For example, the URL http://www.nbc.com/tv-central/shows/seinfeld/characters/index.html might identify a web page on NBC's web site that describes frequently appearing characters on the Seinfeld television program. Therefore, for the viewers convenience, a value such as "Seinfeld Stars" may be associated with the name attribute for this logical address link. Similarly, a web page relating to guest stars, such as the web page located at http://www.nbc.com/tvcentral/shows/seinfeld/characters/char2.html might be associated with the name "Seinfeld Guest Stars."

Various other attributes are contemplated by the assignee of the present invention. For example, a mechanism for purging old links may utilize an attribute that identifies a date or a date and time at which a logical address link expires. In this manner, after the date indicated, logical address links having an expires attribute may be purged from the client's memory.

Importantly, attributes are optional and need not appear in any particular order. For purposes of illustration, exemplary logical address links are listed below (note, however, the checksums have not been calculated):

<http://www.nbc.com/tvcentral/shows/seinfeld/characters/index.html>[name:Seinfeld Stars] [A6F1]

<http://www.tvprogram.com>[type:program] [name:TV Program] [C8C5]

<http://advsponsor.net>[type:sponsor] [name:Special Offer] [BFA0]

<http://madkad_network.com>[type:network] [1128]

<http://www.coolsite.com>[6C1D]

Importantly, it should be appreciated that logical addresses are not limited to URLs and that URLs are not limited to the "http:" scheme. Therefore, the following would also be recognized as valid logical address links:

<mailto:info@advsponsor.net>[type:sponsor] [5FDB]

<news: alt.tv.program] [type:program] [391B]

Checksum

A checksum is appended to the end of the logical address link in order to detect data corruption that may occur during receipt or transmission of the logical address link. Preferably, a two byte hexadecimal checksum is employed such as a checksum that would be produced by the standard TCP/IP checksum algorithm described in Request For Comments (RFC) 719, "Internet Protocol", September 1981 which is incorporated herein by reference. According to one embodiment, the checksum is computed by pairing adjacent characters in the string (starting with the first delimiter) to form 16-bit integers. If there are an odd number of characters, the final character is paired with a byte of zeroes. At any rate, the checksum is computed such that the one's complement sum of all of the 16-bit integers plus the checksum equals the 16-bit integer with all 1 bits. That is, the checksum is the one's complement of the one's complement sum of the 16-bit integers. Advantageously, in this manner, a great deal less errors go undetected than in previously suggested 7-bit checksum schemes with only a negligible increase in the logical address link's overall length.

Transmission of Logical Address Links

Figure 4:
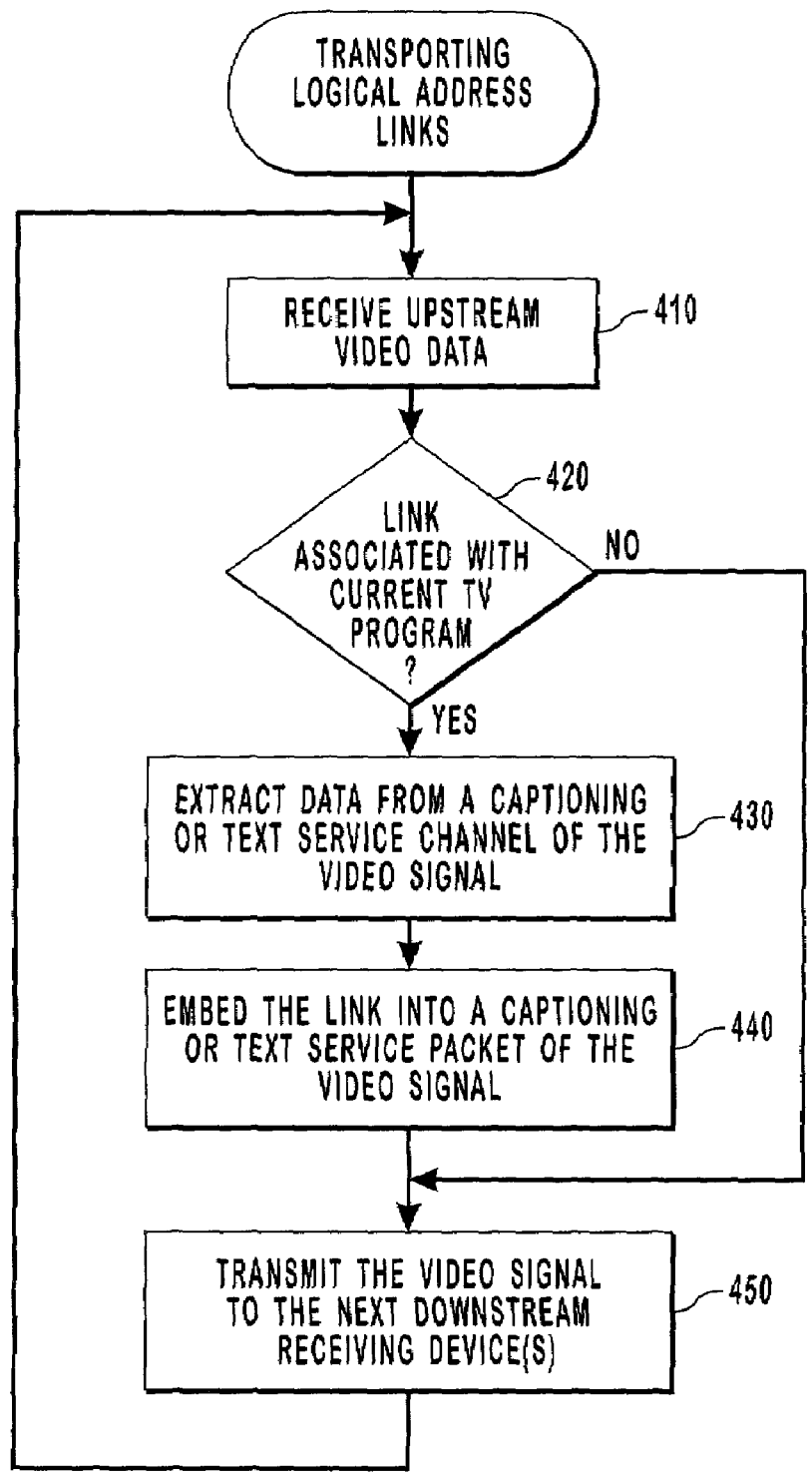
FIG. 4 is a flow diagram illustrating a method of transporting logical address links according to one embodiment of the present invention.

Referring now to FIG. 4, a flow diagram illustrating a method of transporting logical address links according to one embodiment of the present invention is illustrated. In this embodiment, logical address link data to be inserted by a content provider, e.g., a program producer, broadcaster, affiliate, cable or satellite provider, is inserted into upstream video (the source of video onto which the new data will be encoded). At step 410, upstream video data is received from a previous point in the video signal distribution path. At step 420, a determination is made as to whether or not the current distribution point has one or more logical address links that are to be associated with the current TV program being transmitted. If not, processing continues with step 450. Otherwise, processing proceeds with step 430.

Importantly, the upstream video may or may not contain previously encoded data, such as logical address links, in line 21 of the VBI. Each content provider, therefore, is a potential re-encoding point along the distribution path. At step 430, the existing data is extracted from the captioning data channel or the text service channel of the video signal. Subject to certain bandwidth limitations, the content provider then embeds one or more logical address links into a captioning or text service packet of the video signal (step 440). Finally, at step 450, the video signal is transmitted to the next downstream receiving device(s). This process may be repeated during video signal processing at each point along the video signal distribution path.

Reception and Processing of Logical Address Links

Figure 5:
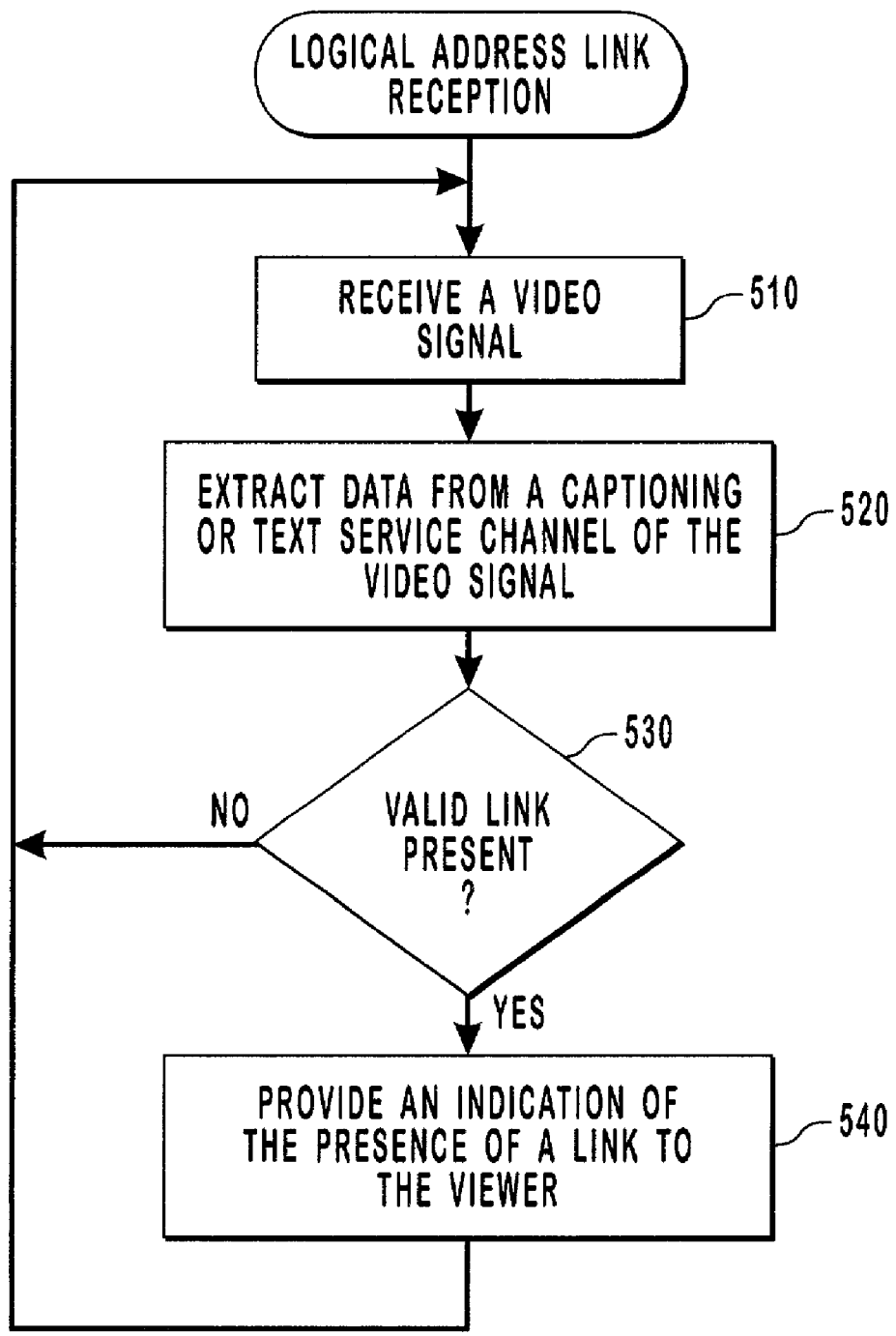
FIG. 5 is a flow diagram illustrating logical address link reception processing according to one embodiment of the present invention.

Logical address link enabled receiving devices, such as a set-top box 10, are able to receive and process logical address links embedded in line 21 of the VBI of an NTSC video signal. FIG. 5 is a flow diagram illustrating logical address link reception processing according to one embodiment of the present invention. At step 510, a broadcast video signal, such as an NTSC video signal, is received. Video data extracted from the broadcast video signal is passed through to the display device, e.g., a TV 12 or other display device, such as a computer monitor, for presentation to the viewer.

Encoded data within a captioning or text service channel of the video signal is extracted at step 520 and it is determined whether or not a valid logical address link is present (step 530). A valid logical address link is one that is encoded in a predetermined syntax, such as described earlier, and whose logical address and attribute/value pairs are not corrupted as determined by a comparison of a checksum generated by the receiving device to the checksum accompanying the logical address link. If a valid logical address link is present, then processing continues with step 540. At step 540, an indication is provided to the viewer that a logical address link is associated with the TV program currently being viewed. According to various embodiments of the present invention, the indication may be visual, audible, or a combination of one or more audible and visual indications. For example, an icon may be temporarily displayed in one of the corners of the display area. Additionally, a tone may accompany the icon's initial presentation. It is appreciated that various other alert mechanisms are possible. In any event, continued reception and processing of the broadcast video signal and embedded logical address links may be achieved by returning to step 510. Returning to step 530, if no valid logical address link is present in the video signal, then processing loops back to step 510.

Combining Real-Time Logical Address Links and Batch Mode Logical Address Links

By providing access to both real-time logical address links and batch mode logical address links, the advantages of both can be enjoyed. Because batch mode logical address links are known in advance, the client system may pre-fetch the resources associated with the logical address links and cache them for quicker retrieval. However, batch mode logical address links are limited in that they may be outdated by the time a program is aired. For example, a sporting event may go into overtime and overlap a previously designated time slot for another program. In this case, one or more batch mode logical address links may no longer be accurate. This problem may be remedied by employing logical address link merging logic to selecting between previously stored batch mode logical address links and real-time logical address links according to predefined rules as discussed further below. The situation involving outdated batch mode logical address links illustrates one of the advantages of real-time logical address links.

Since real-time logical address links do not need to be scheduled as far in advance as batch mode logical address link, real-time logical address links may be more appropriate for certain content. For example, if a logical address link is to be associated with a commercial sponsor, it is useful to transport a logical address link in the VBI or the video signal during the advertisement rather than employing a batch mode logical address link and hoping the commercial will be presented at a particular time.

Figure 6:
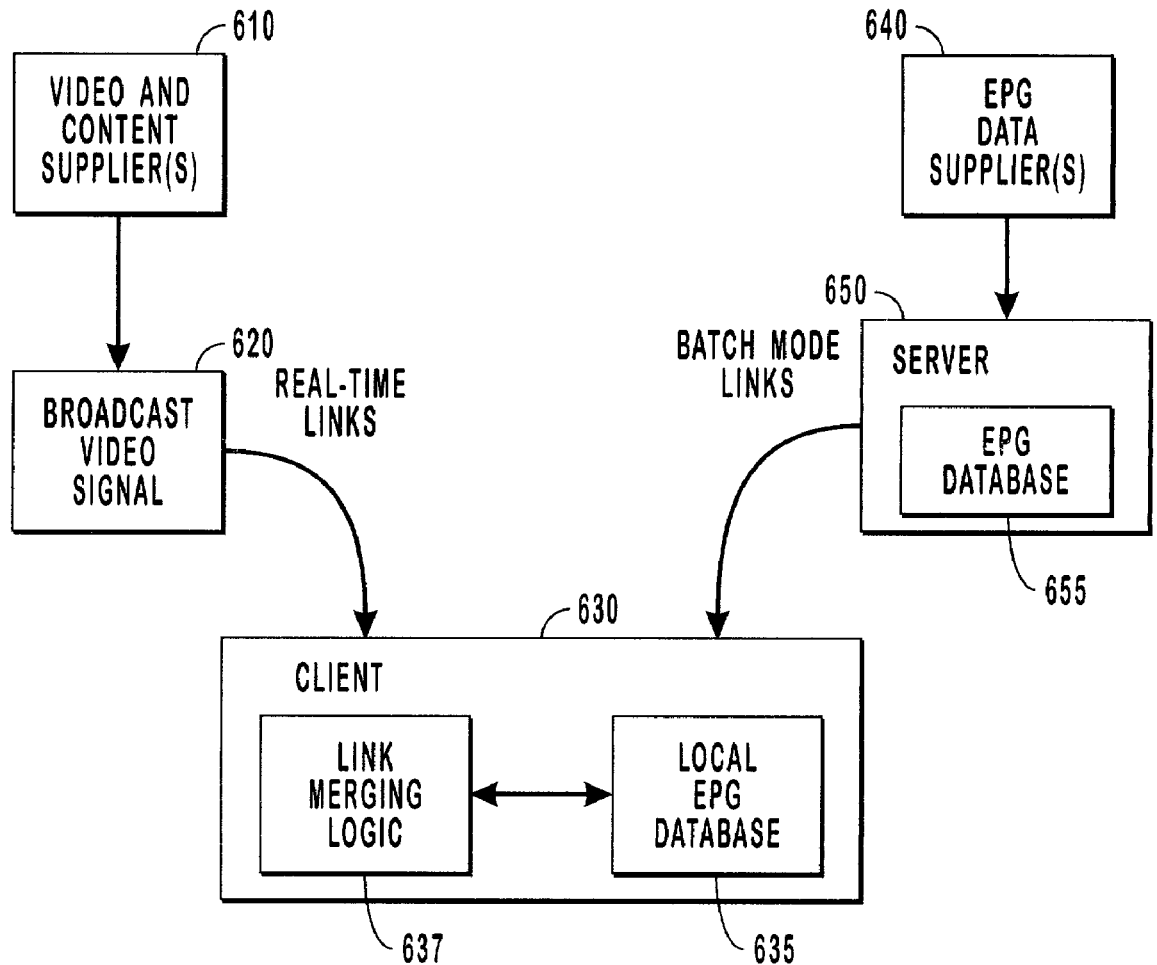
FIG. 6 conceptually illustrates how real-time logical address links and batch mode logical address links may be combined according to one embodiment of the present invention.

FIG. 6 conceptually illustrates how real-time logical address links and batch mode logical address links may be combined according to one embodiment of the present invention. Batch mode logical address links originate from EPG data suppliers 640, such as TV Data, StarSight Telecast, Inc., Tribune Media Services, WebTV Networks, Inc., and the like. The EPG data suppliers 640 may provide TV listings and related batch mode logical address links to a server 650. The TV listing information typically contains at least program start times, program end times, and a station identifier. Depending upon the EPG data supplier, more or less information may be provided.

The server 650 maintains an EPG database 655 by receiving EPG information from multiple sources (potentially each in a different format) and translating the information into a common format. According to one embodiment, the server 650 may add further batch mode logical address links to those already present in the EPG information received from the EPG data suppliers 640. In any event, the batch mode logical address links are transmitted to the client 630 periodically or upon request by the client 630. Real-time logical address links originate from various video and content suppliers 610, such as the program producer, the broadcaster, the local affiliate, the cable/satellite distributor, commercial sponsors, etc. The real-time logical address links are transported by inserting them directly into the broadcast video signal 620 as described above.

The client 630 includes logical address link merging logic 637 and a local EPG database 635. The logical address link merging logic 637 may represent one or more software routines that implement predefined rules to facilitate the selection between real-time and batch mode logical address links. In some circumstances, it may be appropriate to replace a batch mode logical address link with a real-time logical address link. In other situations, it may be convenient or make more sense to supplement existing batch mode logical address links with newly received real-time logical address links.

Figure 7:
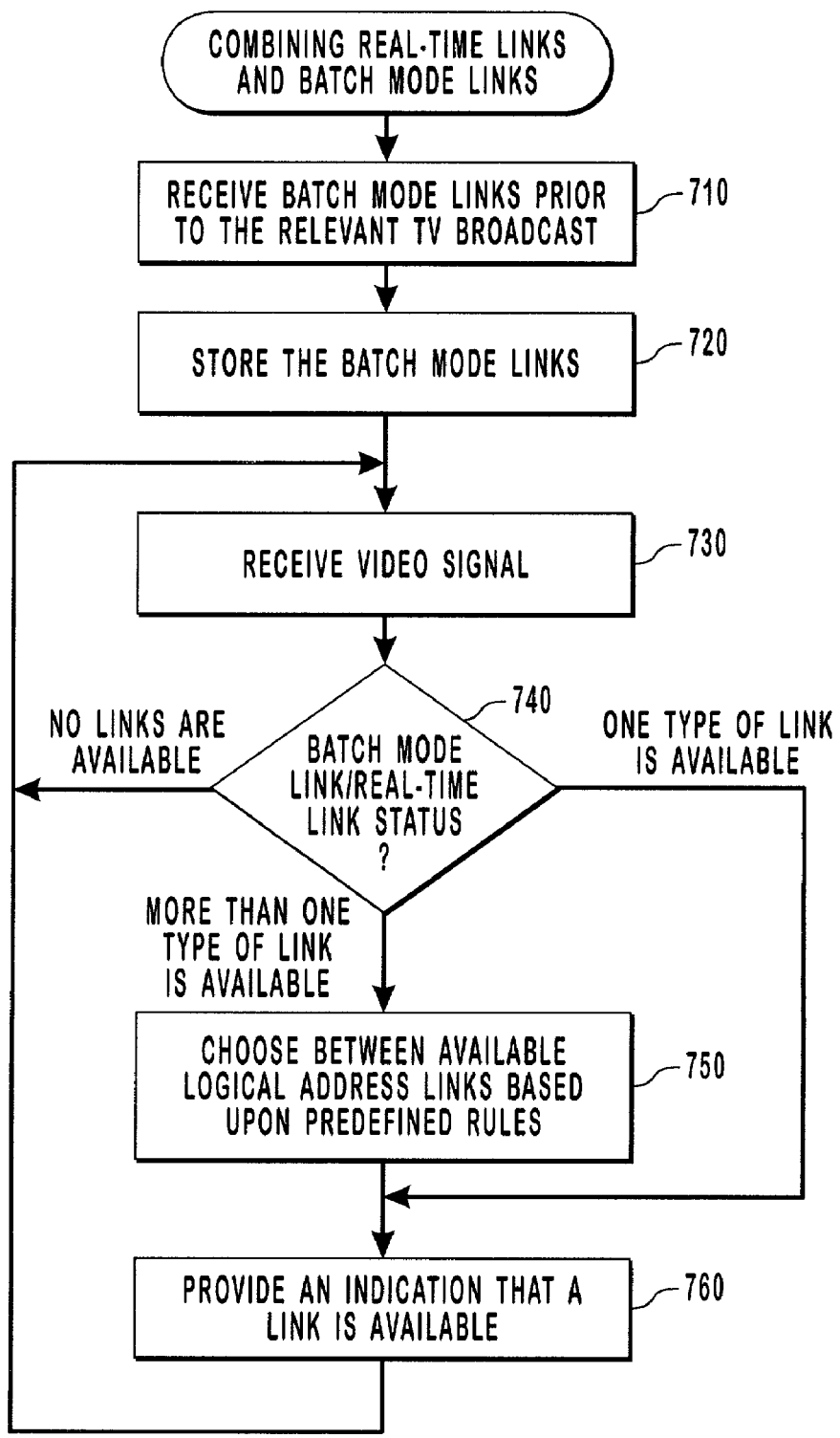
FIG. 7 is a flow diagram illustrating a method of combining real-time logical address links and batch mode logical address links according to one embodiment of the present invention.

An exemplary method of combining real-time and batch mode logical address links will now be described with reference to FIG. 7. At step 710, batch mode logical address links are received by the viewer's client system. Preferably, the batch mode logical address links are received prior to any relevant TV broadcast. It is appreciated that many distribution mechanisms may be employed. For example, the batch mode logical address links may be distributed to client systems through the Internet. Alternatively, EPG data including batch mode logical address links may be distributed in electronic form on a computer readable medium, such as a CD-ROM or diskette. Regardless of the distribution mechanism employed, in the embodiment depicted, the batch mode logical address links are stored in an EPG database local to the viewer's client system (step 720). Subsequently, at step 730, during the broadcast of a video signal, one or more real-time logical address links may be received (embedded in line 21 of the VEI, for example). At step 740, the logical address link status for the current TV program is determined. In the embodiment depicted, if more than one type of logical address link is available, then processing continues with step 750. However, if only one type of logical address link is available, then processing bypasses step 750 and continues with step 760 When no logical address links are available, then processing continues back at step 730 In alternative embodiments, the status and availability of batch mode logical address links may be determined once per program prior to step 740. In this manner, indications of available logical address links may be presented to the viewer at appropriate times without having to continually access the local EPG database.

At step 750, the logical address link merging logic 637 chooses between the available logical address links based upon predefined rules. The logical address link merging logic 637 may choose to present to the user both logical address links, only the real-time logical address link, or only the batch mode logical address link. It is contemplated that batch mode logical address links may include links to information of general interest to the viewer while real-time logical address links may include links to more specific information. For example, EPG information may include a link to a Seinfeld fan club home page or other resource of general interest to Seinfeld viewers. In contrast, the real-time logical address links received during the Seinfeld program may contain links relevant to the particular Seinfeld episode. In this example, since the real-time logical address links and the batch mode logical address links do not interfere with one another, both may be presented to the viewer.

In one embodiment, a "priority" attribute may accompany real-time logical address links to facilitate this decision making process. One priority value may indicate that the real-time logical address link defers to the batch mode logical address link (if one exists), another value may indicate the real-time logical address link overrides any existing batch mode logical address links, and a third value may indicate that the particular real-time logical address link may coexist with any batch mode logical address links that may reside in the local EPG database 635.

After a choice has been made between the various merging options, at step 760, an indication that a logical address link is available is provided to the viewer. The merging of batch mode and real-time logical address links may continue by looping back to step 730.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method of processing logical addresses specifying content associated with a television program, the method comprising the acts of:
    receiving a batch mode logical address associated with a program in advance of the program being broadcast, wherein the batch mode logical address comprises a Uniform Resource Locator (URL);
    receiving a video signal by which the program is broadcast;
    retrieving a real-time logical address and associated data by extracting a sequence of data having a predetermined syntax from a data service channel of the video signal, wherein the associated data comprises a priority attribute, and wherein the real-time logical address comprises a URL;
    selecting one or both logical addresses from among the real-time logical address and the batch mode logical address using, at least in part, the priority attribute; and
    enabling the selected one or both logical addresses to be used to retrieve content specified by the selected one or both logical addresses.

2. The method of claim 1, further comprising the act of decoding the real-time logical address by translating predetermined patterns of one or more Electronic Industries Association 608 standard character set characters within the real-time logical address into a single character in a set of characters from which URLs are comprised.

3. The method of claim 1, wherein the data service channel is one of T1, T2, T3, T4, CC1 CC2, CC3, or CC4 of a vertical blanking interval of the video program.

4. The method of claim 1, wherein the act of receiving the batch mode logical address comprises the act of receiving the batch mode logical address from a Web server.

5. The method of claim 1, wherein the act of receiving the batch mode logical address comprises the act of receiving the batch mode logical address as part of an electronic program guide.

6. The method of claim 1, wherein the selecting also uses predefined rules, wherein the predefined rules specify that:
    the real-time logical address is valid for a predetermined amount of time after receipt; and
    the batch mode logical address is valid for a defined time interval.

7. The method of claim 1, wherein the priority attribute indicates one of three possible priority conditions, the method further comprising:
    if the priority attribute indicates a first priority condition, of the three possible priority conditions, selecting, as the one or both selected logical addresses, only the batch mode logical address;
    if the priority attribute indicates a second priority condition, of the three possible priority conditions, selecting, as the one or both selected logical addresses, only the real-time logical address; and
    if the priority attribute indicates a third priority condition, of the three possible priority conditions, selecting, as the one or both selected logical addresses, both the batch mode logical address and the real-time logical address.

8. The method of claim 1, wherein the priority attribute indicates one of three possible priority conditions, and wherein the three possible priority conditions are a defer condition, an override condition, and a coexist condition.

9. A computer-readable medium storing computer-executable instructions for causing a processing device to perform a method of processing logical addresses specifying content associated with a television program, the method comprising the acts of:
    receiving a batch mode logical address associated with a program in advance of the program being broadcast, wherein the batch mode logical address comprises a Uniform Resource Locator (URL);
    receiving a video signal by which the program is broadcast;
    retrieving a real-time logical address and associated data by extracting a sequence of data having a predetermined syntax from a data service channel of the video signal, wherein the associated data comprises a priority attribute, and wherein the real-time logical address comprises a URL;
    selecting one or both logical addresses from among the real-time logical address and the batch mode logical address using, at least in part, the priority attribute; and
    enabling the selected one or both logical addresses to be used to retrieve content specified by the selected one or both logical addresses.

10. The computer-readable medium of claim 9, further comprising the act of decoding the real-time logical address by translating predetermined patterns of one or more Electronic Industries Association 608 standard character set characters within the real-time logical address into a single character in a set of characters from which URLs are comprised.

11. The computer-readable medium of claim 9, wherein the data service channel is one of T1, T2, T3, T4, CC1 CC2, CC3, or CC4 of a vertical blanking interval of the video program.

12. The computer-readable medium of claim 9, wherein the act of receiving the batch mode logical address comprises the act of receiving the batch mode logical address from a Web server.

13. The computer-readable medium of claim 9, wherein the act of receiving the batch mode logical address comprises the act of receiving the batch mode logical address as part of an electronic program guide.

14. The computer-readable medium of claim 9, wherein the selecting also uses predefined rules, wherein the predefined rules specify that:
   the real-time logical address is valid for a predetermined amount of time after receipt; and
   the batch mode logical address is valid for a defined time interval.

15. The computer-readable medium of claim 9, wherein the priority attribute indicates one of three possible priority conditions, the method further comprising:
   if the priority attribute indicates a first priority condition, of the three possible priority conditions, selecting, as the one or both selected logical addresses, only the batch mode logical address;
   if the priority attribute indicates a second priority condition, of the three possible priority conditions, selecting, as the one or both selected logical addresses, only the real-time logical address; and
   if the priority attribute indicates a third priority condition, of the three possible priority conditions, selecting, as the one or both selected logical addresses, both the batch mode logical address and the real-time logical address.

16. The computer-readable medium of claim 9, wherein the priority attribute indicates one of three possible priority conditions, and wherein the three possible priority conditions are a defer condition, an override condition, and a coexist condition.

17. A system for processing logical addresses specifying content associated with a television program, the system comprising:
   a processing unit, wherein the processing unit executes software configured for:
      receiving a batch mode logical address associated with a program in advance of the program being broadcast, wherein the batch mode logical address comprises a Uniform Resource Locator (URL);
      receiving a video signal by which the program is broadcast;
      retrieving a real-time logical address and associated data by extracting a sequence of data having a predetermined syntax from a data service channel of the video signal, wherein the associated data comprises a priority attribute, and wherein the real-time logical address comprises a URL;
      selecting one or both logical addresses from among the real-time logical address and the batch mode logical address using, at least in part, the priority attribute; and
      enabling the selected one or both logical addresses to be used to retrieve content specified by the selected one or both logical addresses.

18. The system of claim 17, wherein the software is further configured for decoding the real-time logical address by translating predetermined patterns of one or more Electronic Industries Association 608 standard character set characters within the real-time logical address into a single character in a set of characters from which URLs are comprised.

19. The system of claim 17, wherein the data service channel is one of T1, T2, T3, T4, CC1 CC2, CC3, or CC4 of a vertical blanking interval of the video program.

20. The system of claim 17, wherein the receiving the batch mode logical address comprises the act of receiving the batch mode logical address from a Web server.

21. The system of claim 17, wherein the receiving the batch mode logical address comprises the act of receiving the batch mode logical address as part of an electronic program guide.

22. The system of claim 17, wherein the selecting also uses predefined rules, wherein the predefined rules specify that:
   the real-time logical address is valid for a predetermined amount of time after receipt; and
   the batch mode logical address is valid for a defined time interval.

23. The system of claim 17, wherein the priority attribute indicates one of three possible priority conditions, wherein the software is further configured for:
   if the priority attribute indicates a first priority condition, of the three possible priority conditions, selecting, as the one or both selected logical addresses, only the batch mode logical address;
   if the priority attribute indicates a second priority condition, of the three possible priority conditions, selecting, as the one or both selected logical addresses, only the real-time logical address; and
   if the priority attribute indicates a third priority condition, of the three possible priority conditions, selecting, as the one or both selected logical addresses, both the batch mode logical address and the real-time logical address.

24. The system of claim 17, wherein the priority attribute indicates one of three possible priority conditions, and wherein the three possible priority conditions are a defer condition, an override condition, and a coexist condition.

* * * * *